United States Patent
Allen et al.

(10) Patent No.: US 9,752,684 B2
(45) Date of Patent: Sep. 5, 2017

(54) PANEL SEALING APPARATUS AND A SEAL ASSEMBLY

(71) Applicant: GM GLOBAL TECHNOLOGY OPERATIONS LLC, Detroit, MI (US)

(72) Inventors: Todd E. Allen, Lake Orion, MI (US); Bradford K. Gauker, Clinton Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/952,285

(22) Filed: Nov. 25, 2015

(65) Prior Publication Data

US 2017/0146129 A1    May 25, 2017

(51) Int. Cl.
- F16J 15/34 (2006.01)
- F16J 15/3252 (2016.01)
- B62D 1/16 (2006.01)

(52) U.S. Cl.
CPC ............ *F16J 15/3252* (2013.01); *B62D 1/16* (2013.01)

(58) Field of Classification Search
CPC ............... B62D 1/16; B62D 3/02; F16J 15/16
See application file for complete search history.

(56) References Cited

U.S. PATENT DOCUMENTS

| | | | | | |
|---|---|---|---|---|---|
| 5,426,993 | A | * | 6/1995 | Bodo | B62D 1/16 74/484 R |
| 6,056,297 | A | * | 5/2000 | Harkrader | F16J 3/041 277/634 |
| 8,469,399 | B2 | * | 6/2013 | Allen | F16J 15/3224 277/630 |
| 2013/0057015 | A1 | * | 3/2013 | Allen | F16J 15/3224 296/70 |
| 2014/0099049 | A1 | | 4/2014 | Allen | |

* cited by examiner

*Primary Examiner* — Gilbert Lee
(74) *Attorney, Agent, or Firm* — Quinn IP Law

(57) ABSTRACT

A seal assembly includes a cover. A panel sealing apparatus includes the seal assembly. The apparatus includes a wall defining an orifice and the cover is disposed through the orifice. The cover includes a collar and a flange extending outwardly away from the collar. The cover defines an aperture through the collar and the flange. The assembly also includes a plate overlapping the flange and defining a hole. The collar of the cover is disposed through the hole. The assembly further includes a seal defining a passageway. The cover is disposed through the passageway. The assembly also includes a bushing defining an opening. The collar of the cover is disposed through the opening such that the bushing surrounds the collar. At least one of the plate and the bushing is configured to allow movement of the cover independently of the seal.

20 Claims, 3 Drawing Sheets

PANEL SEALING APPARATUS AND A SEAL ASSEMBLY

TECHNICAL FIELD

The present disclosure relates to a panel sealing apparatus and a seal assembly.

BACKGROUND

Vehicles can include a dash panel or bulkhead that separates a passenger compartment from an engine compartment. A steering shaft passes through a hole in the dash panel such that a portion of the steering shaft is disposed in the passenger compartment and another portion of the steering shaft is disposed in the engine compartment. A steering wheel is attached to the steering shaft and disposed in the passenger compartment to allow a user to steer the vehicle. A seal is disposed about the steering shaft to minimize fluid communication between the passenger compartment and the engine compartment via the hole in the dash panel.

SUMMARY

The present disclosure provides a seal assembly including a cover. The cover includes a collar and a flange extending outwardly away from the collar. The cover defines an aperture through the collar and the flange. The assembly also includes a plate overlapping the flange and defining a hole. The collar of the cover is disposed through the hole. The assembly further includes a seal defining a passageway. The cover is disposed through the passageway. The assembly also includes a bushing defining an opening. The collar of the cover is disposed through the opening such that the bushing surrounds the collar. At least one of the plate and the bushing is configured to allow movement of the cover independently of the seal.

The present disclosure also provides a panel sealing apparatus including a wall defining an orifice. The apparatus includes the seal assembly discussed above, with the cover disposed through the orifice.

The detailed description and the drawings or Figures are supportive and descriptive of the disclosure, but the claim scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the figures to aid the reader's understanding, and do not represent limitations (for example, to the position, orientation, or use, etc.) on the scope of the disclosure, as defined by the appended claims. Furthermore, the term "substantially" can refer to a slight imprecision or slight variance of a condition, quantity, value, or dimension, etc., some of which that are within manufacturing variance or tolerance ranges.

Figure 1:
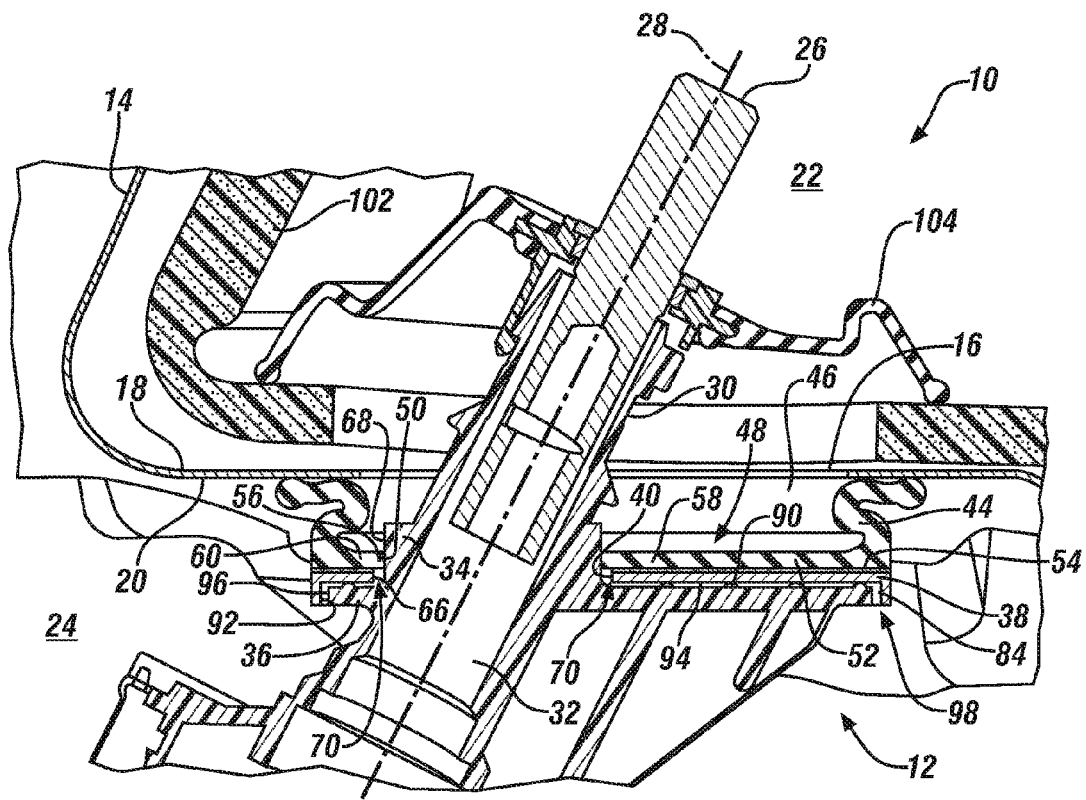
FIG. 1 is a schematic fragmentary cross-sectional view of a panel sealing apparatus and a seal assembly.

Referring to the Figures, wherein like numerals indicate like or corresponding parts throughout the several views, a panel sealing apparatus 10 and a seal assembly 12 are generally shown in FIG. 1.

The panel sealing apparatus 10 and the seal assembly 12 can be utilized in many different applications. For example, the panel sealing apparatus 10 can be utilized in a vehicle application or a non-vehicle application. The vehicle can be an automotive vehicle, such as, a car, a truck, etc. It is to be appreciated that the vehicle can alternatively be a non-automotive vehicle, such as, a farm vehicle, a marine vehicle, an aviation vehicle, etc. It is to be appreciated that the panel sealing apparatus 10 and the seal assembly 12 can be utilized with any other suitable vehicle or non-vehicle applications that can utilize such panel sealing apparatus 10 and/or the seal assembly 12 as disclosed herein.

Continuing with FIG. 1, the panel sealing apparatus 10 includes a wall 14 defining an orifice 16. The wall 14 can be any suitable configuration. The wall 14 can include a first surface 18 and a second surface 20 opposing each other. When the wall 14 is utilized in the vehicle application, the first surface 18 can generally face a passenger compartment 22 of the vehicle and the second surface 20 can generally face an engine compartment 24 of the vehicle. The passenger compartment 22 can contain one or more seats for passenger(s) to utilize. The engine compartment 24 can contain one or more of an engine, a transmission, etc. Therefore, in the vehicle application, the wall 14 can at least partially divide the passenger compartment 22 and the engine compartment 24. In the vehicle application, the wall 14 can be referred to as a dash panel or bulkhead.

The panel sealing apparatus 10 can further include a shaft 26 (see FIG. 1) disposed through the orifice 16 of the wall 14 along a longitudinal axis 28. For example, in the vehicle application, the shaft 26 can be a steering column, and the steering column can be disposed through the orifice 16. A steering wheel can be attached to the steering column and disposed in the passenger compartment 22 to allow the passenger to steer the vehicle. A steering gear can be coupled to the steering column and disposed in the engine compartment 24. When the shaft 26 is the steering column, the steering column is selectively rotatable about the longitudinal axis 28. Therefore, in certain embodiments, the shaft 26 is selectively rotatable about the longitudinal axis 28.

Figure 2:
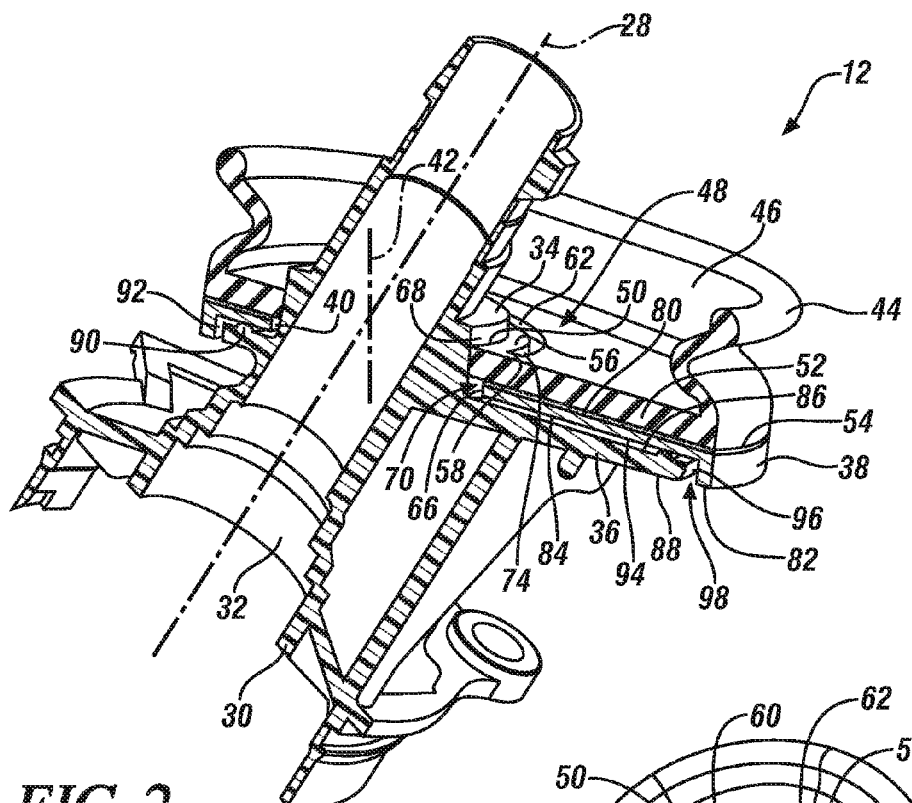
FIG. 2 is a schematic perspective cross-sectional view of a cover, a plate, a bushing and a seal of the seal assembly of FIG. 1.

Referring to FIGS. 1 and 2, the seal assembly 12 includes a cover 30. Generally, the cover 30 is disposed through the orifice 16. The cover 30 can define an aperture 32 and the shaft 26 can be disposed through the aperture 32.

Figure 6:
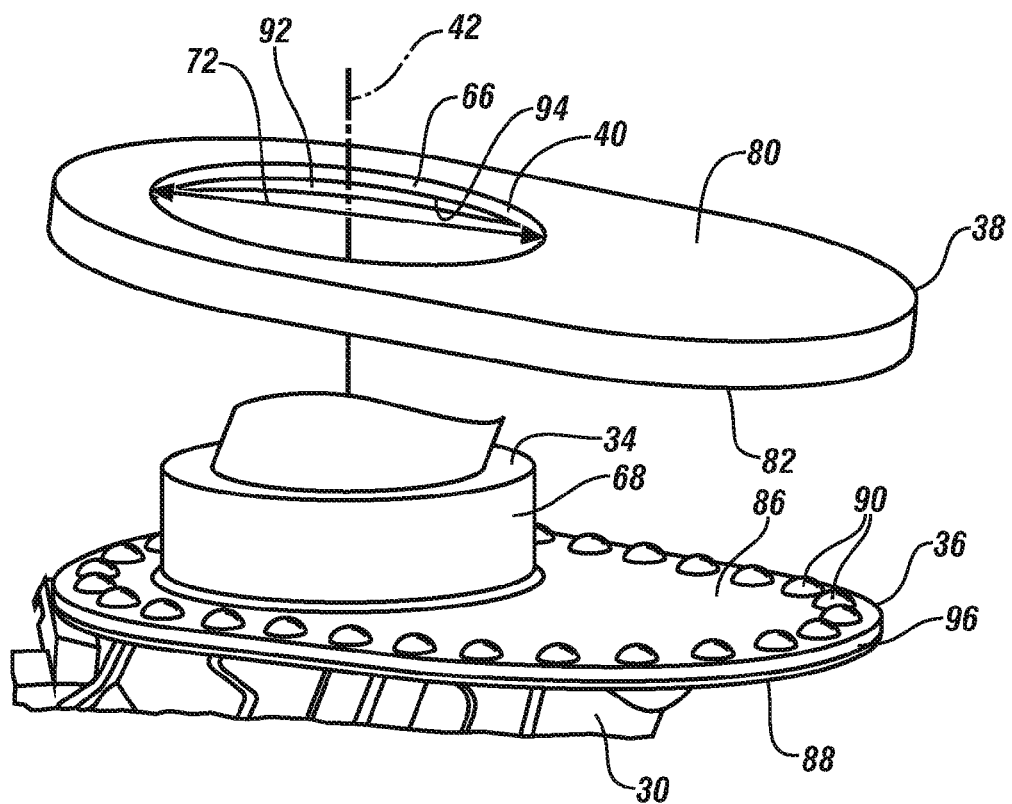
FIG. 6 is a schematic fragmentary perspective view of the cover with the plate exploded from the cover.

Turning to FIGS. 1, 2 and 6, the cover 30 includes a collar 34 and a flange 36 extending outwardly away from the collar 34. As discussed above, the cover 30 defines the aperture 32, and in certain embodiments, the aperture 32 is disposed through the collar 34 and the flange 36 of the cover 30.

The seal assembly 12 also includes a plate 38 overlapping the flange 36 (as best shown in FIGS. 1 and 2) and defines a hole 40 (as best shown in FIG. 6). The collar 34 of the cover 30 is disposed through the hole 40. Generally, the hole 40 of the plate 38 is disposed along a first axis 42. In certain embodiments, the shaft 26 can be disposed angularly through the hole 40. Therefore, depending on the desired orientation of the shaft 26 through the orifice 16, for example, the longitudinal axis 28 can be disposed transverse to the first axis 42 (see FIG. 2), or can be disposed coaxial with the first axis 42. For illustrative purposes only, FIG. 1 illustrates the shaft 26 disposed angularly relative to the first axis 42 (see FIG. 2), and therefore, as best shown in FIG. 2, the longitudinal axis 28 is disposed transverse to the first axis 42 in the Figures.

Referring to FIGS. 1 and 2, the seal assembly 12 also includes a seal 44 defining a passageway 46 and the cover 30 is disposed through the passageway 46. In certain embodiments, the seal 44 is disposed along the engine compartment 24 side of the wall 14. Therefore, the seal 44 can abut the second surface of the wall 14. Generally, the passageway 46 of the seal 44 is disposed along the first axis 42. For illustrative purposes only, the passageway 46 of the seal 44 is illustrated as non-concentric with the first axis 42. In other words, the passageway 46 is not centered along the first axis 42 in the Figures. It is to be appreciated that depending on the desired orientation of the passageway 46, the passageway 46 can be coaxial with the first axis 42.

Figure 3:
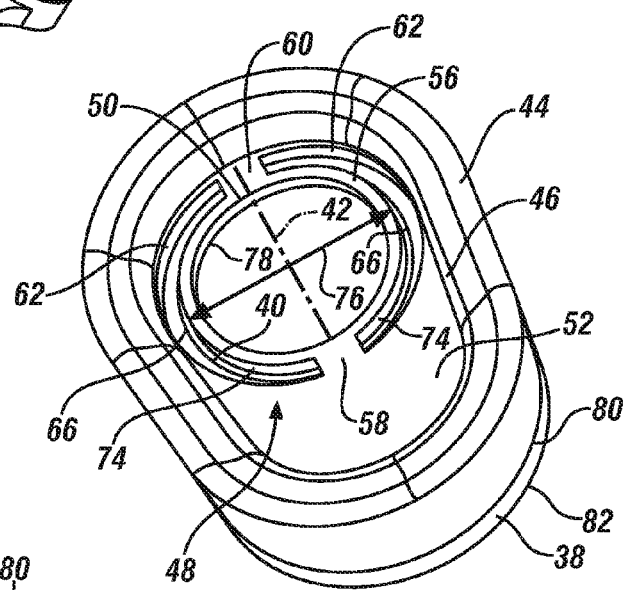
FIG. 3 is a schematic perspective view of the seal, the bushing and the plate with a ring of the bushing aligning axially with a hole of the plate.

As best shown in FIGS. 1 and 3, the seal assembly 12 further includes a bushing 48 defining an opening 50. The collar 34 of the cover 30 is disposed through the opening 50 such that the bushing 48 surrounds the collar 34. Generally, the opening 50 of the bushing 48 is disposed along the first axis 42. The seal 44 can extend from the bushing 48 and engage the wall 14 to minimize fluid communication through the orifice 16 of the wall 14. Specifically, as discussed above, the seal 44 can engage the second surface 20 of the wall 14. The seal 44 can apply a compressive force to the wall 14 to minimize fluid communication through the orifice 16 of the wall 14. For example, the seal 44 can prevent noise, gaseous fluid, liquid fluid and debris from entering the passenger compartment 22 through the orifice 16.

The bushing 48 can include a base 52 secured to the plate 38. The base 52 is secured to the plate 38 to maintain the position of the seal 44 relative to the plate 38. Adhesive 54 (see FIGS. 1 and 2), one or more fasteners, one or more lips, one or more clips, one or more grooves, or any other suitable feature(s) or method(s) can be utilized to secure the base 52 to the plate 38.

In certain embodiments, the seal 44 extends outwardly from the base 52. Specifically, the seal 44 extends toward the wall 14 and away from the plate 38. As such, the seal 44 can extend toward the second surface 20 of the wall 14. In one embodiment, the bushing 48 and the seal 44 are integrally formed as one piece. For example, the seal 44 can be integral with the base 52 of the bushing 48. In other embodiments, the bushing 48 and the seal 44 are separate pieces. When the seal 44 is a separate piece from the bushing 48, the seal 44 can include a lip that overlaps part of the plate 38 to secure the seal 44 to the plate 38 which maintains the position of the seal 44 relative to the plate 38. For example, the seal 44 and the plate 38 can be overmolded.

At least one of the plate 38 and the bushing 48 is configured to allow movement of the cover 30 independently of the seal 44. In certain embodiments, both the plate 38 and the bushing 48 are configured to allow movement of the cover 30 independently of the seal 44. The phrase "at least one of" as used herein should be construed to include the non-exclusive logical "or", i.e., at least one of the plate 38 and the bushing 48. Therefore, the plate 38 can be configured to allow movement of the cover 30 independently of the seal 44 or the bushing 48 can be configured to allow movement of the cover 30 independently of the seal 44. In other embodiments, both the plate 38 and the bushing 48 can be configured to allow movement of the cover 30 independently of the seal 44.

Movement of the cover 30 can be isolated from the seal 44. Specifically, lateral movement of the cover 30 can be isolated from the seal 44. For example, movement of the cover 30 substantially perpendicular to the first axis 42 can be isolated from the seal 44. Movement of the cover 30 can be caused by many different events, and a couple of non-limiting examples are discussed below. For example, when the steering wheel transmits rotation through the shaft 26 to the steering gear, a load, such as a dynamic load, can be transmitted through the cover 30 which causes the cover 30 to move laterally. As another example, if the vehicle moves over a bump, a hole, etc. in a road, a load, such as a dynamic load, can be created that can be transmitted through the cover 30 which also can cause the cover 30 to move laterally.

The plate 38 and/or the bushing 48 are configured to prevent transmitting the movement of the cover 30 to the seal 44. Specifically, the transfer of lateral movement of the cover 30 to the seal 44 is minimized. Therefore, lateral movement of the seal 44 is minimized which allows the seal 44 to maintain its position relative to the wall 14 to prevent fluid communication through the orifice 16. As such, the seal 44 can maintain the compressive force with the wall 14 which prevents fluid communication through the orifice 16 of the wall 14.

Turning to FIG. 3, the bushing 48 can include a ring 56 spaced from the base 52, and the ring 56 defines the opening 50. The ring 56 is movable in response to movement of the cover 30. The ring 56 is offset from the hole 40 of the plate 38 along the first axis 42 which allows the ring 56 to move relative to the plate 38 during movement of the cover 30 such that the ring 56 can partially overlap the plate 38. Therefore, the ring 56 aligns with the hole 40 in an axially spaced relationship (see FIGS. 3 and 4). Simply stated, the ring 56 is suspended over the hole 40 of the plate 38 but is not disposed inside the hole 40 of the plate 38.

Figure 5:
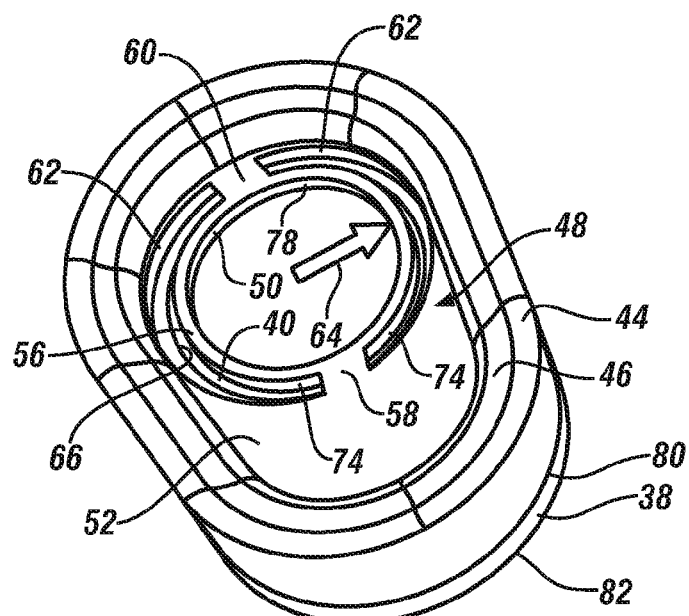
FIG. 5 is a schematic perspective view of the ring of the bushing partially overlapping the plate when the ring shifts due to movement of the cover.

Continuing with FIG. 3, the bushing 48 can include a first connector 58 and a second connector 60 spaced from each other. In certain embodiments, the first and second connectors 58, 60 oppose each other. Each of the connectors 58, 60 is disposed between the ring 56 and the base 52 to space the ring 56 from the base 52 to define a pair of slots 62 between the ring 56 and the base 52 that allow movement of the ring 56 relative to the base 52. Therefore, the slots 62 create space for movement of the ring 56 relative to the base 52. FIG. 5 illustrates an arrow 64 that represents an example of the direction that the cover 30 can shift which causes the ring 56 to partially overlap the plate 38. The movement of the ring 56 can cause the configuration of the slots 62 to change as shown in FIG. 5 for illustrative purposes only. Therefore, the slots 62 can isolate movement of the cover 30.

Figure 4:
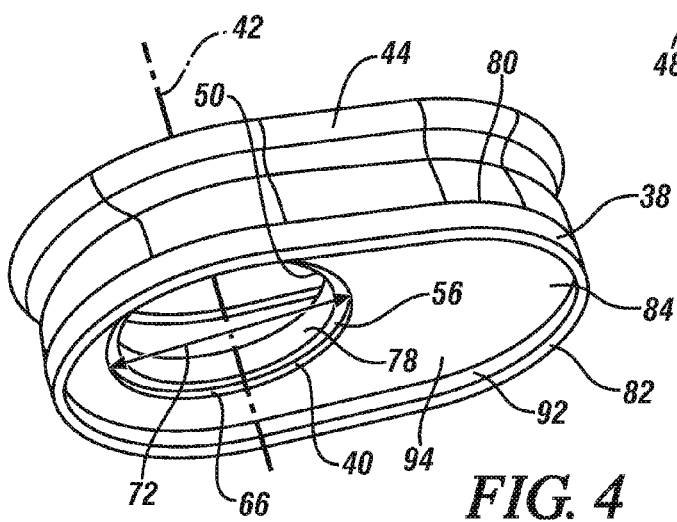
FIG. 4 is a schematic perspective view of the ring of the bushing aligning axially with the hole of the plate.

Referring to FIGS. 1, 4 and 6, the plate 38 can include an inner surface 66 defining the hole 40. The collar 34 of the cover 30 can include an outer surface 68 facing away from the first axis 42 and the inner surface 66 faces the first axis 42. Therefore, the inner surface 66 of the plate 38 and the outer surface 68 of the collar 34 face each other. The inner surface 66 of the plate 38 is spaced from the outer surface 68 of the collar 34 to define a space 70 (see FIGS. 1, 2 and 7) therebetween which allows the cover 30 to move relative to the plate 38. Therefore, the plate 38 can isolate movement of the cover 30.

Turning to FIG. 3, the ring 56 can include a periphery 74 facing away from the first axis 42. The periphery 74 defines a second diameter 76. Also turning to FIG. 4, the inner surface 66 of the plate 38 defines a first diameter 72. Generally, the first diameter 72 is greater than the second diameter 76. As such, the periphery 74 of the ring 56 is smaller than the inner surface 66 of the plate 38. Therefore, the ring 56 is smaller than the hole 40, and the ring 56 can suspend over the hole 40 of the plate 38 as discussed above.

The periphery 74 of the ring 56 can be further defined as a first periphery 74 and the ring 56 can include a second periphery 78 (best shown in FIGS. 3 and 5) opposing the first periphery 74. The second periphery 78 faces the first axis 42. The outer surface 68 of the collar 34 engages the second periphery 78 of the ring 56. The engagement between the collar 34 and the ring 56 causes movement of the cover 30 to be transferred to the ring 56 through the collar 34. The ring 56 and the collar 34 remain in engagement with each other regardless of movement of the cover 30.

As best shown in FIGS. 4 and 6, the plate 38 can include a first side 80 and a second side 82 opposing the first side 80 of the plate 38. The hole 40 of the plate 38 is disposed through the first and second sides 80, 82 of the plate 38. The bushing 48 is disposed over the first side 80 of the plate 38. Therefore, the bushing 48 is spaced from the second side 82 of the plate 38. As the ring 56 moves due to movement of the cover 30, the slots 62 change configuration, and the ring 56 can move partially over the first side 80 of the plate 38 (see FIG. 5).

Figure 7:
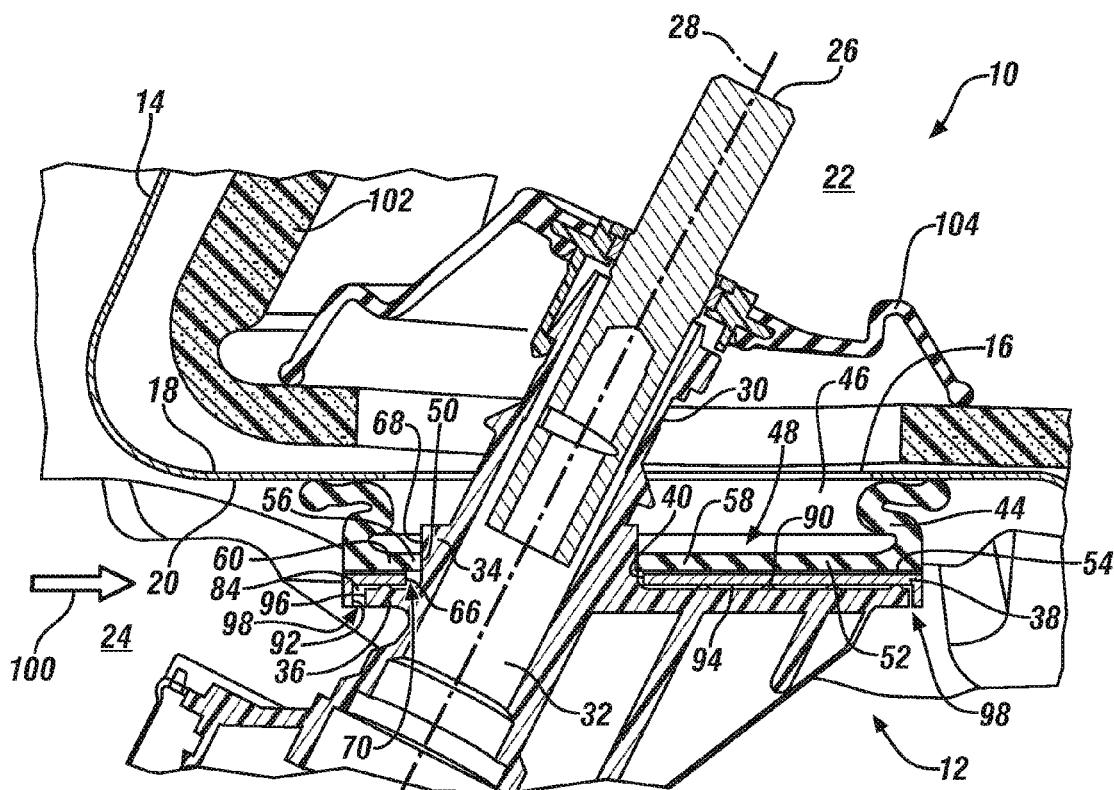
FIG. 7 is a schematic fragmentary cross-sectional view of the panel sealing apparatus and the seal assembly, with the cover shifted as compared to FIG. 1.

As best shown in FIGS. 1, 2 and 7, the second side 82 of the plate 38 can define a recess 84. The flange 36 is disposed in the recess 84. In certain embodiments, the bushing 48 is spaced from the second side 82 of the plate 38. As such, in certain embodiments, the base 52 can be secured to the first side 80 of the plate 38, such as by the adhesive 54 as discussed above. In other embodiments, such as when the seal 44 is a separate piece from the bushing 48, the lip of the seal 44 can overlap the plate 38 and engage the second side 82 of the plate 38 to secure the seal 44 to the plate 38.

Turning to FIG. 6, the flange 36 can include a first side 86 and a second side 88 opposing the first side 86 of the flange 36. The first side 86 of the flange 36 faces the bushing 48 and includes a plurality of protrusions 90 spaced from each other. Each of the protrusions 90 is disposed in the recess 84. The protrusions 90 reduce the contact area between the plate 38 and the flange 36.

Referring to FIGS. 1, 2 and 4, the recess 84 extends into the second side 82 of the plate 38 to present a side surface 92 disposed radially relative to the first axis 42 and a bottom surface 94 of the plate 38 disposed transverse to the side surface 92. In certain embodiments, the protrusions 90 engage the bottom surface 94 of the plate 38.

Referring to FIGS. 1, 2, 6 and 7, the flange 36 can include an outer periphery 96 facing the side surface 92. The side surface 92 and the outer periphery 96 are spaced from each other to define a gap 98 therebetween which allows movement of the flange 36 independently of the plate 38. The gap 98 allows movement of the flange 36 independently of the plate 38 which minimizes movement of the seal 44. FIG. 7 illustrates the cover 30 moving in a direction represented by an arrow 100 relative to the position shown in FIG. 1, which changes size of the gap 98 and the space 70 while the seal 44 remains engaged with the wall 14. FIG. 7 also illustrates that the collar 34 and the ring 56 remain in engagement when the cover 30 moves.

Therefore, as discussed above, when the cover 30 shifts, the plate 38 is configured to allow the cover 30 to move relative to the plate 38 without transferring that movement to the seal 44. As another example, as also discussed above, when the cover 30 shifts, the ring 56 of the bushing 48 is configured to allow movement of the ring 56 relative to the plate 38 without transferring that movement to the seal 44. As such, the seal assembly 12 discussed herein can minimize the transfer of lateral movement from the cover 30 to the seal 44.

As discussed above, optionally, the seal 44 and the bushing 48 can be separate pieces. In such an embodiment, the configuration of the bushing 48 can be changed, and for example, the bushing 48 can include two rings (one ring 56 is illustrated herein) which are interconnected by the first and second connectors 58, 60. One of the rings 56 can be disposed inside the other one of the rings in a spaced relationship. As such, one of the rings 56 can be referred to as an inner ring 56 and the other one of the rings can be referred to as an outer ring. Therefore, the first and second connectors 58, 60 space the rings 56 from each other to define the pair of slots 62 between the rings 56 that allow movement of the inner ring 56 relative to the outer ring. The inner ring 56 aligns with the hole 40 of the plate 38 in the offset manner discussed above for the ring 56 and the outer ring overlaps and engages the plate 38. Specifically, the outer ring can engage the first side 80 of the plate 38. Optionally, the outer ring can be disposed in a second recess defined by the first side 80 of the plate 38.

In addition, the panel sealing apparatus 10 can optionally include a noise suppression layer 102 disposed along the wall 14. For example, the noise suppression layer 102 can face the first surface 18 of the wall 14. Furthermore, the panel sealing apparatus 10 can optionally include a second seal 104 attached to the cover 30 and engaging the noise suppression layer 102 when being utilized, or engaging the first surface 18 of the wall 14 when the noise suppression layer 102 is removed. Therefore, the second seal 104 is disposed along the passenger compartment 22 side of the wall 14. The shaft 26 can be disposed through the second seal 104. The second seal 104 can minimize fluid communication through the orifice 16 of the wall 14. For example, the second seal 104 can prevent noise, gaseous fluid, liquid fluid and debris from entering the passenger compartment 22 through the orifice 16.

While the best modes and other embodiments for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A seal assembly comprising:
a cover including a collar and a flange extending outwardly away from the collar, with the cover defining an aperture through the collar and the flange;
a plate overlapping the flange and defining a hole, with the collar of the cover disposed through the hole;
a seal defining a passageway, with the cover disposed through the passageway;
a bushing defining an opening, with the collar of the cover disposed through the opening such that the bushing surrounds the collar; and
wherein at least one of the plate and the bushing is configured to allow movement of the cover independently of the seal;
wherein the plate includes a first side and a second side opposing the first side of the plate, with the hole of the plate disposed through the first and second sides of the plate, and wherein the bushing is disposed over the first side of the plate, and the second side of the plate defines a recess, with the flange disposed in the recess.

2. The assembly as set forth in claim 1 wherein the bushing includes a base secured to the plate and the seal extends outwardly from the base.

3. The assembly as set forth in claim 2 wherein the bushing includes a ring spaced from the base and defining the opening, with the ring movable in response to movement of the cover.

4. The assembly as set forth in claim 3 wherein the bushing includes a first connector and a second connector spaced from each other and each disposed between the ring and the base to space the ring from the base to define a pair of slots between the ring and the base that allow movement of the ring relative to the base.

5. The assembly as set forth in claim 3 wherein the opening of the ring and the hole of the plate are disposed along a first axis and the ring is offset from the hole of the plate along the first axis which allows the ring to move relative to the plate during movement of the cover such that the ring partially overlaps the plate.

6. The assembly as set forth in claim 3 wherein the hole of the plate is disposed along a first axis, and the plate includes an inner surface defining the hole, with the inner surface facing the first axis and defining a first diameter, and wherein the ring includes a periphery facing away from the first axis and the periphery defines a second diameter, and wherein the first diameter is greater than the second diameter.

7. The assembly as set forth in claim 1 wherein the flange includes a first side and a second side opposing the first side of the flange, and wherein the first side of the flange faces the bushing and includes a plurality of protrusions spaced from each other and disposed in the recess.

8. The assembly as set forth in claim 7 wherein the hole of the plate is disposed along a first axis and the recess extends into the second side of the plate to present a side surface disposed radially relative to the first axis and a bottom surface of the plate disposed transverse to the side surface, and wherein the flange includes an outer periphery facing the side surface, with the side surface and the outer periphery spaced from each other to define a gap therebetween which allows movement of the flange independently of the plate.

9. The assembly as set forth in claim 1 wherein both the plate and the bushing are configured to allow movement of the cover independently of the seal.

10. A panel sealing apparatus comprising:
a wall defining an orifice;
a seal assembly including:
a cover disposed through the orifice and including a collar and a flange extending outwardly away from the collar, with the cover defining an aperture through the collar and the flange;
a plate overlapping the flange and defining a hole, with the collar of the cover disposed through the hole;
a seal defining a passageway, with the cover disposed through the passageway;
a bushing defining an opening, with the collar of the cover disposed through the opening such that the bushing surrounds the collar; and
wherein at least one of the plate and the bushing is configured to allow movement of the cover independently of the seal;
wherein the plate defines a recess, with the flange disposed in the recess;
wherein the recess of the plate extends into a side of the plate to present a side surface disposed radially relative to the first axis, and wherein the flange includes an outer periphery facing the side surface, with the side surface and the outer periphery spaced from each other to define a gap therebetween which allows movement of the flange independently of the plate.

11. The apparatus as set forth in claim 10 wherein the bushing includes a base secured to the plate and the seal extends outwardly from the base.

12. The apparatus as set forth in claim 11 wherein the bushing includes a ring spaced from the base and defining the opening, with the ring movable in response to movement of the cover.

13. The apparatus as set forth in claim 12 wherein the bushing includes a first connector and a second connector spaced from each other and each disposed between the ring and the base to space the ring from the base to define a pair of slots between the ring and the base that allow movement of the ring relative to the base.

14. The apparatus as set forth in claim 12 wherein the opening of the ring and the hole of the plate are disposed along a first axis and the ring is offset from the hole of the plate along the first axis which allows the ring to move relative to the plate during movement of the cover such that the ring partially overlaps the plate.

15. The apparatus as set forth in claim 12 wherein the hole of the plate is disposed along a first axis, and the plate includes an inner surface defining the hole, with the inner surface facing the first axis and defining a first diameter, and wherein the ring includes a periphery facing away from the first axis and the periphery defines a second diameter, and wherein the first diameter is greater than the second diameter.

16. The apparatus as set forth in claim 10 wherein the plate includes a first side and a second side opposing the first side of the plate, and wherein the side of the plate is further defined as the second side of the plate, and wherein the hole of the plate is disposed through the first and second sides of the plate, and wherein the bushing is disposed over the first side of the plate.

17. The apparatus as set forth in claim 16 wherein the flange includes a first side and a second side opposing the first side of the flange, and wherein the first side of the flange faces the bushing and includes a plurality of protrusions spaced from each other and disposed in the recess.

18. The apparatus as set forth in claim 17 wherein the hole of the plate is disposed along a first axis and the recess extends into the second side of the plate to present the side surface disposed radially relative to the first axis and a bottom surface of the plate disposed transverse to the side surface.

19. The apparatus as set forth in claim 10 wherein both the plate and the bushing are configured to allow movement of the cover independently of the seal.

20. A seal assembly comprising:
- a cover including a collar and a flange extending outwardly away from the collar, with the cover defining an aperture through the collar and the flange;
- a plate overlapping the flange and defining a hole, with the collar of the cover disposed through the hole;
- a seal defining a passageway, with the cover disposed through the passageway;
- a bushing defining an opening, with the collar of the cover disposed through the opening such that the bushing surrounds the collar;
- wherein at least one of the plate and the bushing is configured to allow movement of the cover independently of the seal;
- wherein the bushing includes a base secured to the plate and the seal extends outwardly from the base;
- wherein the bushing includes a ring spaced from the base and defining the opening, with the ring offset from the hole of the plate such that the ring is suspended over the hole without being disposed inside the hole; and
- wherein the bushing includes a first connector and a second connector spaced from each other and each disposed between the ring and the base to space the ring from the base to define a pair of slots that surround the ring.

* * * * *